US012762781B2

(12) United States Patent
Kuznietsov

(10) Patent No.: US 12,762,781 B2
(45) Date of Patent: Oct. 13, 2026

(54) SYSTEM AND METHOD FOR THE AUTOMATED CREATION OF SHADERS IN 3D GRAPHICS DESIGN

(71) Applicant: Hyron AI LTD, Windsor (GB)

(72) Inventor: Oleksii Kuznietsov, Newcastle upon Tyne (GB)

(73) Assignee: HYRON AI LTD, Windsor (GB)

( * ) Notice: Subject to any disclaimer, the term of this patent is extended or adjusted under 35 U.S.C. 154(b) by 0 days.

(21) Appl. No.: 18/402,717

(22) Filed: Jan. 2, 2024

(65) Prior Publication Data

US 2025/0111575 A1 Apr. 3, 2025

Related U.S. Application Data

(60) Provisional application No. 63/587,059, filed on Sep. 29, 2023.

(51) Int. Cl.
*G06T 15/00* (2011.01)
*G06N 3/08* (2023.01)

(52) U.S. Cl.
CPC ............. *G06T 15/005* (2013.01); *G06N 3/08* (2013.01); *G06T 2200/24* (2013.01)

(58) Field of Classification Search
CPC ................. G06T 15/005; G06T 11/001; G06T 2207/20084; G06T 5/60; G06T 2207/20081; G06T 2200/24; G06N 3/08; G06N 3/044; G06N 3/034
See application file for complete search history.

(56) References Cited

U.S. PATENT DOCUMENTS

| | | | | |
|---|---|---|---|---|
| 10,902,670 | B1 * | 1/2021 | Schied | G06T 15/506 |
| 11,151,769 | B2 | 10/2021 | Labbe et al. | |
| 11,436,793 | B1 * | 9/2022 | Schied | G06T 7/90 |
| 2020/0082491 | A1 | 3/2020 | Harris | |

(Continued)

OTHER PUBLICATIONS

T. Nguyen-Phuoc, et al., "Rendernet: a Deep Convolutional network for differentiable rendering from 3d shapes", 32nd Conference on Neural Information Processing Systems (NeurIPS 2018), Montreal, Canada, Dec. 3-8, 2018, pp. 1-11 (Year: 2018).*

(Continued)

*Primary Examiner* — Jin Cheng Wang
(74) *Attorney, Agent, or Firm* — GALVIN PATENT LAW LLC; Brian R. Galvin

(57) ABSTRACT

A system and method for automated generation and optimization of shaders in 3D graphics design comprising a shader optimization engine configured to train, maintain, and deploy one or more optimization algorithms to optimize the creation of 3D shaders, and a real-time shader generator configured to provide an interface for system users to apply and modify shaders created by the shader optimization engine. The optimization models can include latent variable models and artificial neural networks trained in tandem for the creation of 3D shaders to satisfy a given set of design constraints or operational parameters. The system offers real-time shader generation and streaming during project runtime, enabling instant viewing and adjustments by designers. This novel approach streamlines the traditionally labor-intensive process of shader creation, thereby enhancing workflow efficiency and expanding creative possibilities.

16 Claims, 8 Drawing Sheets

(56) References Cited

U.S. PATENT DOCUMENTS

| | | | | |
|---|---|---|---|---|
| 2022/0067983 | A1* | 3/2022 | Fidler | G06V 20/58 |
| 2022/0309736 | A1* | 9/2022 | Bigos | G06T 15/40 |
| 2022/0398446 | A1* | 12/2022 | Xie | G06N 3/094 |
| 2023/0015253 | A1* | 1/2023 | Nie | G06V 10/82 |
| 2023/0146181 | A1* | 5/2023 | Meshkin | G06N 3/04<br>382/274 |
| 2023/0147641 | A1* | 5/2023 | Wang | G06V 20/40<br>345/474 |
| 2023/0169325 | A1* | 6/2023 | Xie | G06N 3/09<br>706/15 |
| 2023/0169715 | A1* | 6/2023 | Lakshminarayana | G06T 11/001 |
| 2023/0176847 | A1* | 6/2023 | Ben-Moshe | G06F 8/443<br>717/168 |
| 2023/0177755 | A1* | 6/2023 | Starke | G06N 3/08<br>345/473 |
| 2023/0206537 | A1* | 6/2023 | Perry | A63F 13/77 |
| 2024/0005206 | A1* | 1/2024 | Osa | G06N 3/006 |
| 2024/0029455 | A1* | 1/2024 | Xiong | G06V 10/774 |
| 2024/0104698 | A1* | 3/2024 | Nie | G06N 3/044 |
| 2024/0121414 | A1* | 4/2024 | Pedzisz | H04N 19/13 |
| 2024/0152544 | A1* | 5/2024 | Aykut | G06N 3/047 |
| 2024/0185396 | A1* | 6/2024 | Hatamizadeh | G06T 5/60 |
| 2025/0061978 | A1* | 2/2025 | Livne | G16C 20/70 |
| 2025/0069299 | A1* | 2/2025 | Duarte | G06T 11/60 |
| 2025/0131273 | A1* | 4/2025 | Mariooryad | G06N 3/092 |

OTHER PUBLICATIONS

M. Worchel, et al., "Multi-View Mesh Reconstruction with Neural Deferred Shading", Proc. Of the IEEE/CVF Conference on Computer Vision and Pattern Recognition (CVPR), Jun. 18-24, 2022, pp. 6187-6197 (Year: 2022).*

K. Liu, et al., "Towards Disentangling Latent Space for Unsupervised Semantic Face Editing", IEEE Transactions of Image Processing, vol. 31, 2022, Jan. 28, 2022, pp. 1475-1489 (Year: 2022).*

* cited by examiner

SYSTEM AND METHOD FOR THE AUTOMATED CREATION OF SHADERS IN 3D GRAPHICS DESIGN

CROSS-REFERENCE TO RELATED APPLICATIONS

Priority is claimed in the application data sheet to the following patents or patent applications, each of which is expressly incorporated herein by reference in its entirety:

63/587,059

BACKGROUND OF THE INVENTION

Field of the Invention

The disclosure relates to the field of three-dimensional (3D) graphics systems, and more particularly is directed to the problem of efficient creation of 3D graphics shaders.

Discussion of the State of the Art

Three-dimensional (3D) graphic design is a constantly evolving field that is integral to numerous industries, including entertainment, gaming, and architecture. One of the most critical and complex components in 3D graphics design is the creation of shaders. Shaders are used to define how 3D surfaces look and respond to light. They are programs that run on a graphics processing unit (GPU) to control color, brightness, texture, and other visual effects.

Creating shaders manually is a labor-intensive and technically complex process that requires a deep understanding of both the artistic vision and the mathematics involved. Traditional methods of shader creation can be time-consuming and have a steep learning curve, presenting a significant barrier for many designers.

Existing systems for automating shader creation offer limited capabilities and are not capable of generating a comprehensive variety of shaders. Moreover, they lack the capability to adapt to evolving design requirements or to learn from previous designs, and they don't offer real-time shader generation and streaming.

What is needed is a system and method that can streamline the shader creation process, generate a wide variety of shaders, learn and adapt based on previous designs and ongoing analysis, and allow for real-time adjustments during project runtime.

SUMMARY OF THE INVENTION

Accordingly, the inventor has conceived, and reduced to practice, a system and method for automated generation and optimization of shaders in 3D graphics design comprising a shader optimization engine configured to train, maintain, and deploy one or more optimization algorithms to optimize the creation of 3D shaders, and a real-time shader generator configured to provide an interface for system users to apply and modify shaders created by the shader optimization engine. The optimization models can include latent variable models and artificial neural networks trained in tandem for the creation of 3D shaders to satisfy a given set of design constraints or operational parameters. The system offers real-time shader generation and streaming during project runtime, enabling instant viewing and adjustments by designers. This novel approach streamlines the traditionally labor-intensive process of shader creation, thereby enhancing workflow efficiency and expanding creative possibilities.

According to a preferred embodiment, a system for automated three-dimensional (3D) graphics shader design, creation, and optimization is disclosed, comprising a computing system comprising a processor, a memory, and a network interface; a shader optimization subsystem comprising a first plurality of programming instructions that, when operating on the processor, cause the computing system to: receive a configuration parameter; generate and optimize a plurality of 3D shaders; and utilize latent variable models and neural networks to adapt the plurality of 3D shaders based on the configuration parameter.

According to another preferred embodiment, a method for automated three-dimensional (3D) graphics shader design, creation, and optimization is disclosed, comprising the steps of: receiving a configuration parameter; generating and optimizing a plurality of 3D shaders; and utilizing latent variable models and neural networks to adapt the plurality of 3D shaders based on the configuration parameter.

According to an aspect of an embodiment, a real-time shader generator subsystem comprising a second plurality of programming instructions that, when operating on the processor, cause the computing system to: generate and render a user interface that enables a user to view and modify a 3D graphics shader of the plurality of 3D shaders in real-time.

According to an aspect of an embodiment, the user modifications are used as feedback to further refine the latent variable models and neural networks.

According to an aspect of an embodiment, the shader optimization engine is further configured to train the latent variable models and the neural networks using a plurality of training data.

According to an aspect of an embodiment, the training data comprises information about shader design parameters, outcomes, and performance.

According to an aspect of an embodiment, the training data further comprises expert feedback.

According to an aspect of an embodiment, the latent variable models and neural networks adapt the plurality of 3D shaders by: providing the configuration parameter as an input to the latent variable model to extract one or more latent features associated with the configuration parameter; providing the one or more extracted latent features as an input to the neural networks to generate one or more high-dimensional representations; and generating a shader based on the one or more high-dimensional representations.

According to an aspect of an embodiment, the configuration parameter comprises one or more of color value, frame rate, light intensity, surface detail, material properties, and texture qualities.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
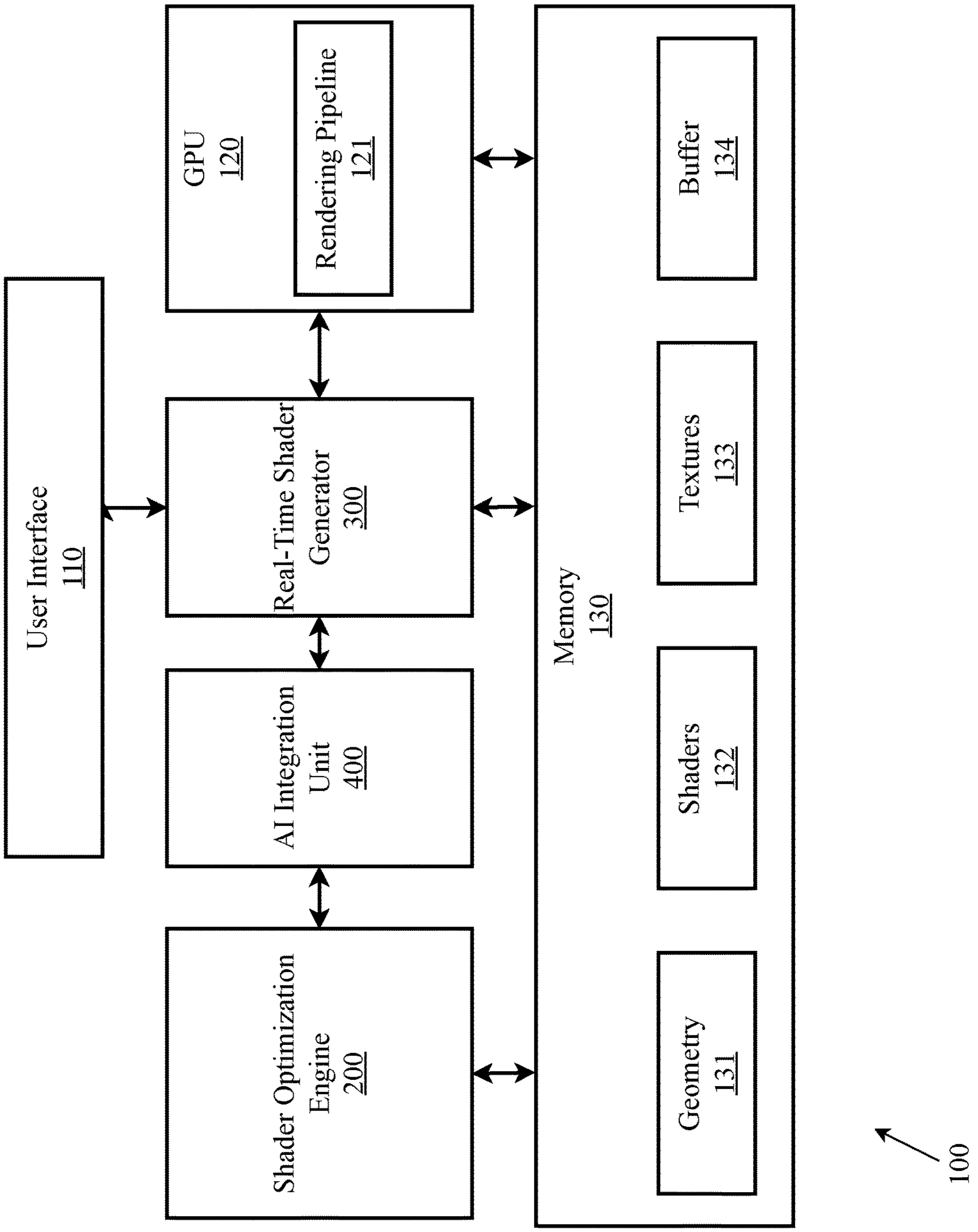
FIG. 1 is a block diagram illustrating an exemplary system architecture for an automated generative system for the creation of shaders in 3D graphics design, according to an embodiment.

The inventor has conceived, and reduced to practice, a system and methods for automated 3D graphics shader design, creation, and optimization.

In the ever-advancing world of 3D graphics design, the necessity for innovative solutions that streamline the creative process is paramount. The invention disclosed herein, an Automated Generative System for the Creation of Shaders in 3D Graphics Design, serves as a revolutionary tool that profoundly transforms the manner in which shaders—key components of 3D graphic design—are generated and optimized. This system, incorporating a blend of cutting-edge computational algorithms and artificial intelligence (AI) methodologies, automates the shader creation process and refines it, thereby enabling the production of high-quality shaders in a more time-effective and cost-efficient way. This substantial technological innovation not only redefines the design process but also propels the exploration of new artistic vistas in the domain of 3D graphics design.

The heart of the Automated Generative System for the Creation of Shaders lies in its innovative approach to shader creation and optimization. Through a blend of advanced optimization algorithms and customizable parameters, the system is able to produce visually compelling and performance-efficient shaders.

The optimization algorithms incorporate a multitude of factors that influence the visual output, such as light intensity, color spectrum, surface details, and texture qualities. Each shader created by the system is an outcome of careful consideration of these parameters, ensuring a design that is not just visually appealing but also performance optimized.

The system also allows for customization by the user, with the ability to adjust the influencing parameters according to specific project requirements. This enables the designers to have more control over the design process while still leveraging the automated capabilities of the system.

In comparison to traditional shader creation methods, the system presents a more streamlined, efficient, and user-friendly approach. The automatic generation and optimization reduce the manual effort and time required, resulting in a more effective workflow and faster design iterations.

Shaders are a crucial component of modern 3D graphics design, rendering, and game development. They are small programs or scripts that run directly on the GPU (Graphics Processing Unit) and are used to control various aspects of the rendering pipeline, such as the appearance, lighting, and effects of 3D objects. Shaders are written in specialized shader languages like OpenGL Shading Language (GLSL), High-Level Shading Language (HLSL), or Vulkan Shader Language (SPIR-V).

Shaders come in various types and have different uses in 3D graphics design. A vertex shader processes each vertex of a 3D model, transforming its position in 3D space. It's responsible for tasks like scaling, translation, rotation, and projecting the 3D objects onto a 2D screen. Fragment shaders determine the color of each pixel on the screen. They handle lighting calculations, textures, and materials, making objects look realistic by defining how they respond to light. Geometry shaders are an optional shader that allow designers to create or modify geometry on the fly. They can add, remove, or transform vertices and primitives, enabling various effects like tessellation or particle systems. Another optional shader is a tessellation shader used to subdivide surfaces into smaller, more detailed parts, which is especially useful for creating smooth curved surfaces.

Shaders are a fundamental part of the rendering pipeline, which includes stages like vertex processing, primitive assembly, rasterization, fragment processing, and frame buffer operations. Shaders run at specific points in this pipeline, allowing you to customize the rendering process. Shaders can accept parameters, such as matrices, textures, and constants, which can be updated during runtime. These parameters allow the system to create dynamic and interactive graphics.

Shaders play a vital role in determining how objects in a 3D scene interact with light sources. This involves calculations for diffuse shading, specular highlights, ambient lighting, and shadow mapping. Shaders are used to apply textures to 3D objects. They control how textures are sampled and mapped onto the surface of an object, allowing for effects like bump mapping, normal mapping, and displacement mapping. Shaders can be employed for post-processing effects like bloom, motion blur, depth of field, and color correction. These effects are applied to the final rendered image to enhance realism or create specific visual styles. Shaders are also used to create various special effects, including particle systems, water simulation, fire, smoke, and dynamic terrain deformation. These effects rely on complex shader logic to achieve realistic and visually appealing results. Efficient shader programming is essential for maintaining good performance. This involves minimizing redundant calculations and utilizing GPU parallelism to process multiple vertices or pixels simultaneously.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for an automated generative system for the creation of shaders in 3D graphics design, according to an embodiment. According to the embodiment, system 100 comprises a user interface 110, a shader optimization engine 200, a real-time shader generator 300, an AI integration unit 400, a graphics processing unit (GPU) 120, and a memory 130. In some implementations, system 100 may comprise a computing device comprising one or more processors and a memory 130. According to some aspects, the computing device may further comprise a display, an input/output interface, and a non-volatile data storage device (e.g., hard drive, solid state drive, etc.). In various embodiments, shader optimization engine 200, real-time shader generator 300, AI integration unit 400 and other system components may be stored in the memory 130 of a computing device as a plurality of computer programming instructions and when executed by at least one processor of the computing device causes the computing device to execute and perform the functionality described herein. In other implementations, system 100 may be configured to operate in a distributed architecture utilizing two or more computing devices connected via a suitable network connection. For example, system may be executed by two or more computing devices operating at the same location (i.e., at a data center) or system can be configured to operate on two or more computing devices at separate geographic locations (i.e., using two or more different data centers). An exemplary computing device that may be used in various implementations of the disclosed invention is provided at FIG. 8.

Shader optimization engine 200 is responsible for enhancing the efficiency of shader production through a blend of advanced optimization algorithms and customizable parameters. It houses a collection of advanced optimization algorithms that factor in various parameters such as light intensity, color values, surface details, and texture qualities to generate visually appealing and realistic shaders. Each shader created by the system is an outcome of careful consideration of these parameters, ensuring a design that is not just visually appealing but also performance optimized. One or more machine and/or deep learning algorithms may be configured to provide shader generation and optimization capabilities. Shaders 132 developed by the one or more machine/deep learning algorithms may be stored in memory 130.

The system also allows for customization by the user, with the ability to adjust the influencing parameters according to specific project requirements. This enables the designers to have more control over the design process while still leveraging the automated capabilities of the system. Real-time shader generator 300 acts as an intermediary between system users and the backend processing systems which facilitate shader generation and is responsible for the on-the-go generation and streaming of shaders during project runtime. This feature can enable immediate viewing and adjustment by designers, thereby reducing the lag between shader creation and its application. During operation, a system user can input/adjust the operational parameters of a given shader during runtime to dynamically adjust the shader. The user can provide, via user interface 110, the operational parameters they require and real-time shader generator can provide these user-defined operational parameters to an AI integration unit 400. AI integration unit 400 can use the received user operational parameters as an input to an artificial neural network to generate a high-dimensional representation of the received operational parameters. The high-dimensional representation of the operational parameters can be sent to shader optimization engine 200 which uses it as an input to the advanced optimization algorithms which in turn process the high-dimensional representations in order to generate a shader which is similar in operational behavior and parameterization as the shader utilized by the user via real-time shader generator 300. This shader may be sent to the memory and applied by GPU 120 in the rendering pipeline 121 so that the user can see in real-time the effects of their selected operational parameters had on the generation of the 3D scene.

AI integration unit 400 may create, train, and maintain one or more machine and/or deep learning algorithms configured to receive inputs from both real-time shader generator 300 and shader optimization engine 400 in order to generate as output high-dimensional representations of the shaders. AI integration unit can capture user shader configuration settings and apply them to an AI system which can create a high-dimensional representation of the user's shader design, and then send this high-dimensional representation to shader optimization engine 200 which can use its advanced optimization algorithms to process the high-dimensional representation to learn one or more latent features, and then apply these learned latent features towards the creation of a new shader which can then be viewed and played with by the user via real-time shader generator 300.

Present in this embodiment is a robust GPU 120 configured to handle the intensive computation needs of shader generation and optimization. The GPU may be configured to execute a 3D rendering pipeline 121 which uses the geometry data 131, textures 133, and generated shaders 132 stored in memory 130 to render scenes. One or more buffers 134 may be present in the memory and used by rendering pipeline 121 to facilitate 3D rendering.

In comparison to traditional shader creation methods, the system presents a more streamlined, efficient, and user-friendly approach. The automatic generation and optimization reduce the manual effort and time required, resulting in a more effective workflow and faster design iterations.

Figure 2:
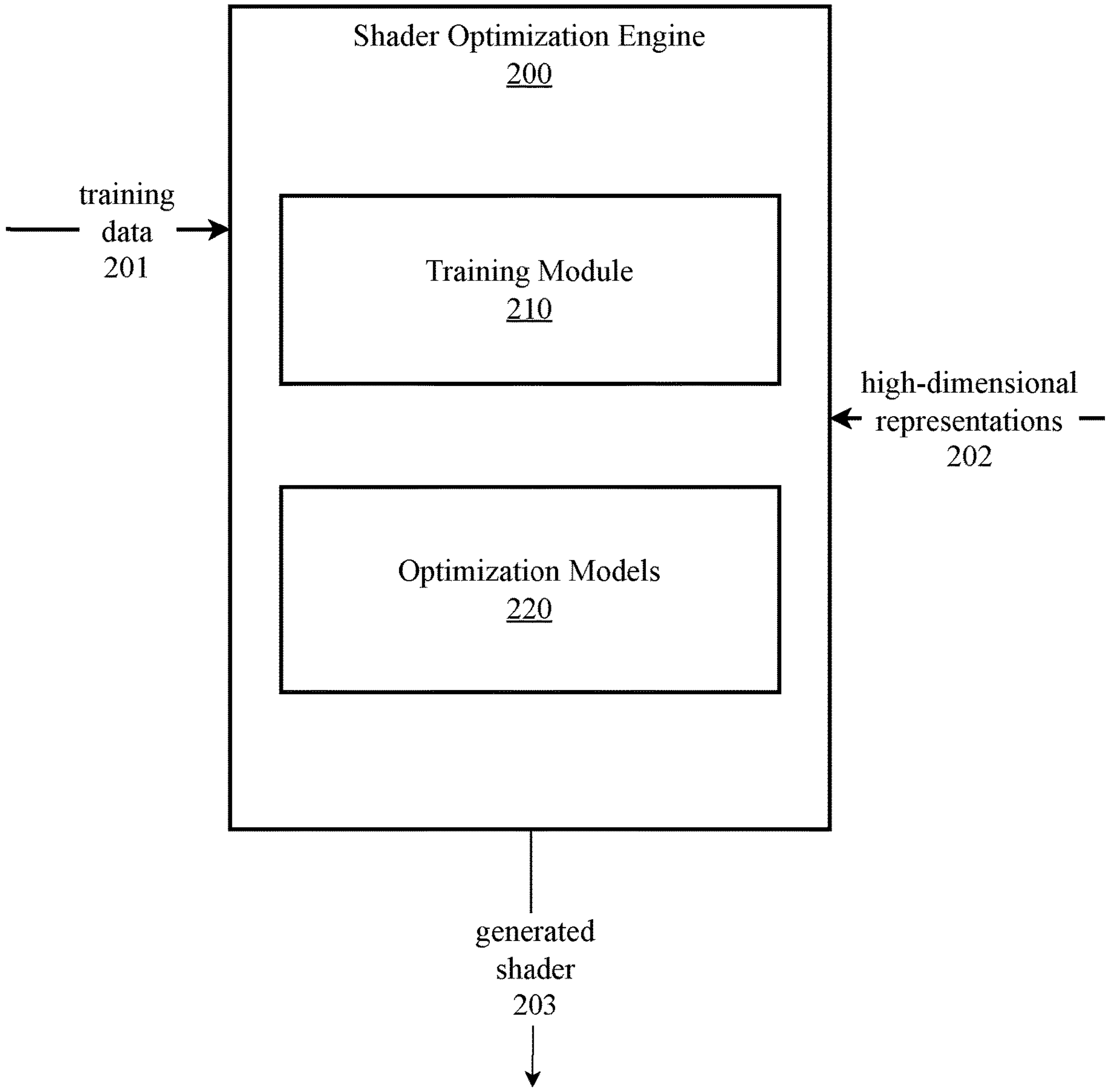
FIG. 2 is a block diagram illustrating an exemplary aspect of an automated generative system for the creation of shaders, the shader optimization engine.

FIG. 2 is a block diagram illustrating an exemplary aspect of an automated generative system for the creation of shaders, the shader optimization engine 200. According to the embodiment, shader optimization engine 200 may comprise a training module 210 configured to receive a plurality of training data 201 from various data sources, preprocesses the training data to prepare the data for use in training, maintaining, and updating one or more optimization models 220. Trained optimization models 220 may be used by shader optimization engine 200 and AI integration unit 400 for the automated creation of 3D shaders. According to the embodiment, shader optimization engine 200 can receive accepted or confirmed shader parameters that have been modified by a system user and have been processed by AI integration unit 400 and received as high-dimensional representations 202. For example, a shader may be generated and a user can interact in real-time with the shader via real-time shader generator 300 by viewing and modifying the configuration of the shader in real-time. These modifications may be captured by AI integration unit 400 and sent to shader optimization engine 200 as high-dimensional representations 202 and applied as training data. In this way, the optimization models 220 can learn from accepted shader designs with expert feedback applied.

Training module 210 may comprise a model training stage comprising a data preprocessor, one or more machine and/or deep learning algorithms, training output, and a parametric optimizer, and a model deployment stage comprising a deployed and fully trained model(s) configured to generate 3D shaders. Training module 210 may be used to train and deploy optimization models 220 in order to support the shader generation capabilities of system 100.

At the model training stage, a plurality of training data 201 may be received at machine training module 210. In some embodiments, the plurality of training data may be obtained from one or more database(s) and/or directly from various information sources. Training module 210 can preprocess the input data by performing various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Training module 210 may also be configured to create a training dataset, a validation dataset, and a test set from the plurality of input data 201. For example, a training dataset may comprise 80% of the preprocessed input data, the validation dataset comprising 10%, and the test dataset may comprise the remaining 10% of the data. The preprocessed training dataset may be fed as input into one or more machine and/or deep learning algorithms to train a shader optimization model 220 for 3D shader generation.

During model training, training output is produced and used to measure the accuracy and usefulness of the model outputs. During this process a parametric optimizer may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation units in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, training module 210 provides a machine learning training loop.

According to an embodiment, the training output shaders produced by the model are validated by subject matter experts (i.e., computer animation artists, virtual effects artists, game developers, etc.). The expert's annotations may then be used to in the next round of model training, improving the process and increasing model performance.

The test dataset can be used to test the accuracy of the model outputs. If the training model is making shaders that satisfy a certain criterion (e.g., baseline behavior, etc.), then it can be moved to the model deployment stage as a fully trained and deployed optimization model 220 in a production environment generating 3D shaders 203. The optimization model can output a generated shader 203 which can be stored in memory 130 and obtained by GPU 120 and utilized via rendering pipeline 121 to create a scene. Further, shaders generated by optimization model 220 can be used as feedback and applied to model training via training module 210, wherein the model is continuously learning over time using training data 201, high-dimensional representations 202, and generated output 203.

A model and training database may be present and configured to store training/validation/test datasets and developed models. Such a database may also store previous versions of models. Database may be a part stored in memory 130 or in a suitable non-volatile data storage device, or some combination thereof.

According to some embodiments, the one or more machine and/or deep learning models may comprise any suitable algorithm known to those with skill in the art including, but not limited to: supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms may comprise a deep learning algorithm such as latent variable models and/or neural networks (e.g., recurrent, convolutional, long short-term memory networks, etc.). According to an aspect, the optimization algorithms 220 may comprise one or more latent variable models (LVMs).

Figure 3:
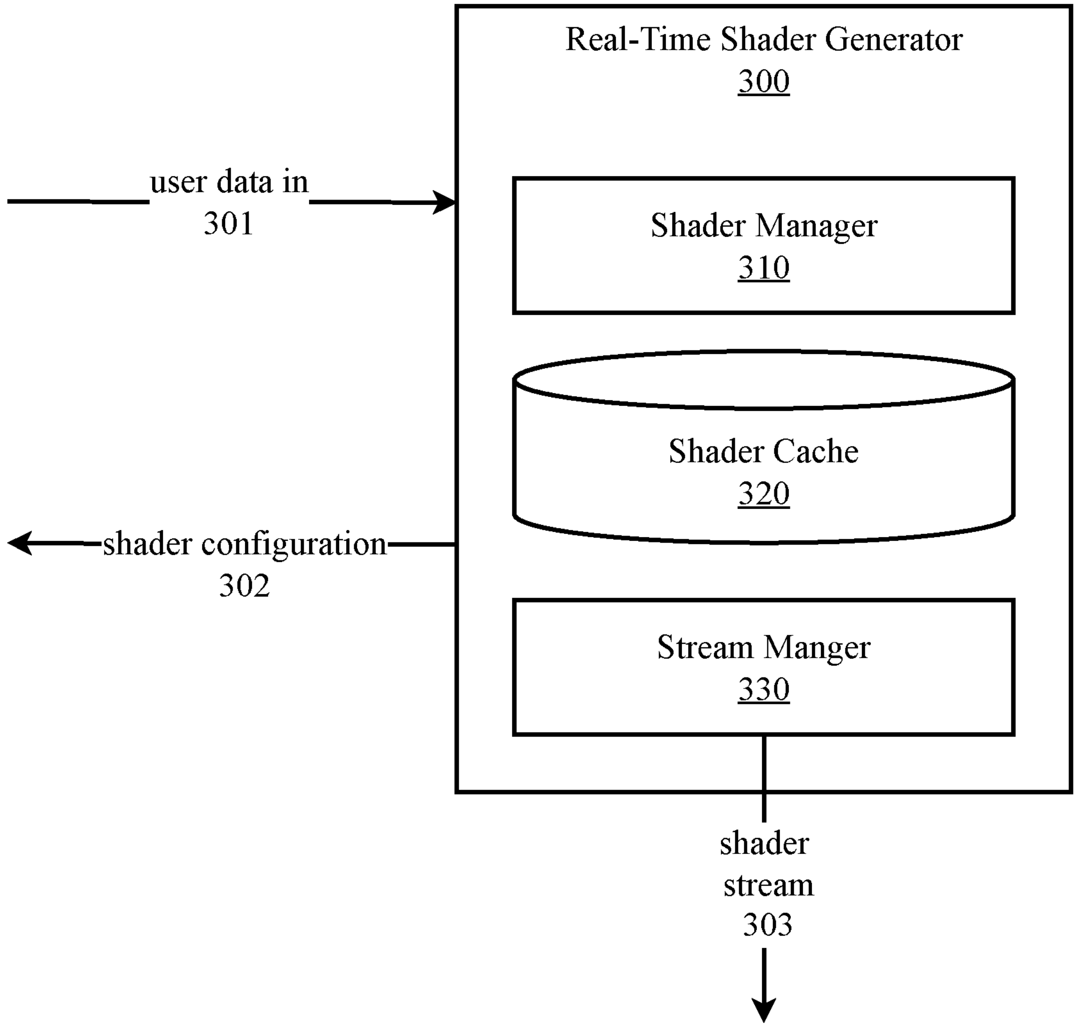
FIG. 3 is a block diagram illustrating an exemplary aspect of an automated generative system for the creation of shaders, the real-time shader generator.

FIG. 3 is a block diagram illustrating an exemplary aspect of an automated generative system for the creation of shaders, the real-time shader generator 300. According to the embodiment, real-time shader generator 300 is configured to act as the interface between the UI 110 and the backend processing components of system 100. In some implementations, real-time shader generator 300 may be configured to generate and render a user interface 110. Real-time shader generator 300 facilitates the generation of shaders in real-time, allowing designers to see instant results of their design choices. This feature is useful and beneficial because is speeds up the design process, enabling faster iterations, and ultimately leading to better end products. In addition to real-time generation, real-time shader generator 300 can support server streaming, where the shaders are generated on the server and streamed to the client device's hardware, making it possible to used advanced shaders even on lower-end devices and hardware.

Designers interact with the system primarily through a user interface, where they input the desired shader parameters. The system can also allow for a degree of creative control by letting designers tweak the output shaders or select from a range of generated options. Furthermore, the system is designed to learn from these interactions, using feedback to further refine its shader generation capabilities. Over time, this creates a personalized shader creation tool that can intuitively understand and meet each designer's unique requirements.

The system allows users to customize influencing parameters according to the specific requirements of their projects. This customization provides designers with more control over the shader design process while still benefiting from the system's automated capabilities. According to the embodiment, real-time shader generator 300 may comprise a shader manager 310 configured to receive user data 301, the user data comprising one or more operational parameter configurations for a shader or some other design or artistic requirement or constraint, and apply the user data for the generation of a 3D shader. Some exemplary shader configurations and/or constraints can include, but are not limited to, frame rate (e.g., 30 or 60 frames per second), GPU compatibility, avoiding over complexity, realism versus artistic style, lighting and shadows, texture mapping, colors, material properties, level of detail (LOD), dynamic LOD, memory usage, texture compression, anti-pattern avoidance, and/or the like. Shader manager 310 can send the user provided shader configuration data 302 to AI integration unit 400 which can use the user provided shader configuration data as an input to an artificial neural network for generating a high dimensional representation of the designer's shader configuration.

In some implementations, a user (e.g., designer) can alter a shader's parameters and may be able to also "approve" or otherwise provide an indication that the generated shader is useful, or sufficient, in that it satisfies the user's requirements. The altered shader parameters and/or the user's approval/indication of sufficiency may be stored in a shader cache 320. Shader manager 310 can provide the information stored in shader cache 320 AI integration unit 400 and/or shader optimization engine 200 to be applied to a next iteration of model training. In this way, users, who are generally experts and/or professionals in the field of 3D graphic design/animation, can provide expert level feedback as well as training set comprising generated shaders which have been "approved" or verified as useful, which can be used to provide feedback to the optimization models to improve the performance. The optimization models continuously learn from past shader designs and adapt to current project requirements. They also can predict future trends in shader design. For example, the system can analyze the effectiveness and aesthetics of existing shaders and use this information to generate improved or novel shaders.

A stream manager 330 may also be present and configured to support streaming capabilities. In such an embodiment, a shader may be generated on the server side by system 100, and then stream manager 330 can stream the shader to the appropriate user endpoint (i.e., computing hardware) via a suitable network connection such as, for example, the Internet. Stream manager 330 may also be configured to receive, via the communication network, user provided shader configuration parameters which can be used as an input to the optimization models 220 for the generation of a 3D shader.

Figure 4:
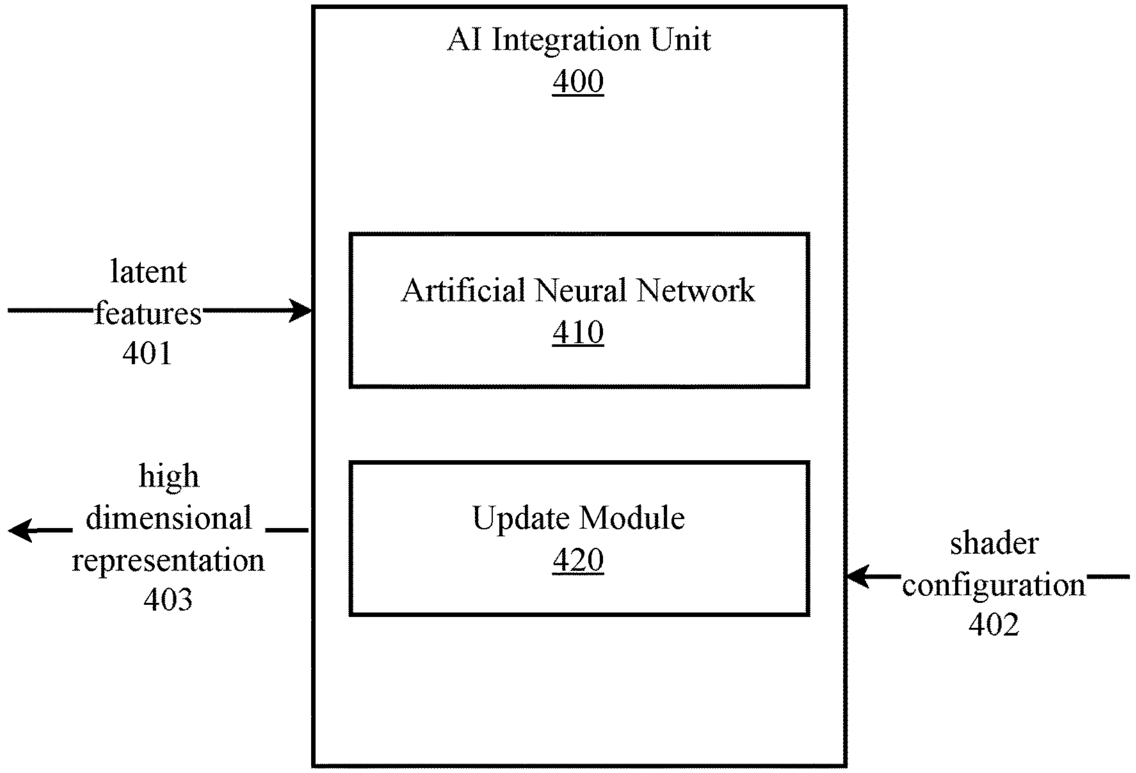
FIG. 4 is a block diagram illustrating an exemplary aspect of an automated generative system for the creation of shaders, the AI integration unit.

FIG. 4 is a block diagram illustrating an exemplary aspect of an automated generative system for the creation of shaders, the AI integration unit 400. According to the embodiment, AI integration unit 400 comprises an artificial neural network 410 and an update module 420.

According to the embodiment, AI integration unit 400 hosts the system's 100 AI capabilities, implementing artificial neural networks 410 to learn from previous shader designs and adjust to current artistic requirements, fostering a broad spectrum of shader generation. A neural network may be trained on the same training data as optimization models, but it also receives latent features generated by optimization models and uses the latent features as an input. The artificial neural network uses the combination of training data and latent features to generate a high-dimensional representation 403 of various shaders. An update module 420 is present and configured to send the high-dimensional representations to shader optimization engine 200 when model updates are available. This higher-order representation may be sent to shader optimization engine 200 where it can be used as in input to optimization algorithms for the generation of 3D shaders.

In operation, AI integration unit 400 can receive, via real-time shader generator 300, one or more shader configurations 402 which can be used as an input to the artificial neural network 410 to generate high-dimensional representations of the shader configuration parameters. These representations can be sent to shader optimization engine 200 to be used as inputs to optimization algorithms to generate custom 3D shaders which satisfy the artistic requirements of a given use case. For example, a user can configure a shader uniform to customize the behavior of the shader, wherein the shader uniform is used as an input to the neural network and subsequently the optimization models 220 to generate a 3D shader. Uniforms can be values like matrices, textures, or other constants. As another example, a computer animation artist may specify the camera angles and lighting effects that need to be applied to a specific scene or image by providing such information to real-time shader generator 300. This user provided information is sent to AI integration unit which utilizes the data as an input, processes the data and sends it to optimization engine 200 and outputs a 3D shader which satisfies the user's constraints.

According to an aspect, the artificial neural new 410 used by AI integration unit 400 may comprise one or more latent variable models (LVMs) and/or one or more neural networks. The use of AI neural networks adds a transformative element to the shader creation process. This feature facilitates the creation of shaders that are not only technically proficient, but also artistically innovative. The neural networks may analyze a wide range of factors including, but not limited to, color, texture, light, and patterns from previous shader designs, learning from each one. This learning enables the neural networks to predict and generate shaders that adhere to specific design principles while also pushing the boundaries on innovation. In addition to learning form past shaders, the neural networks also adapt to real-time inputs and adjustments from designers, allowing for dynamic and interactive shader creation via real-time shader generator 300. This aspect makes system 100 highly flexible and adaptable, capable of meeting diverse project requirements and artistic visions.

Figure 5:
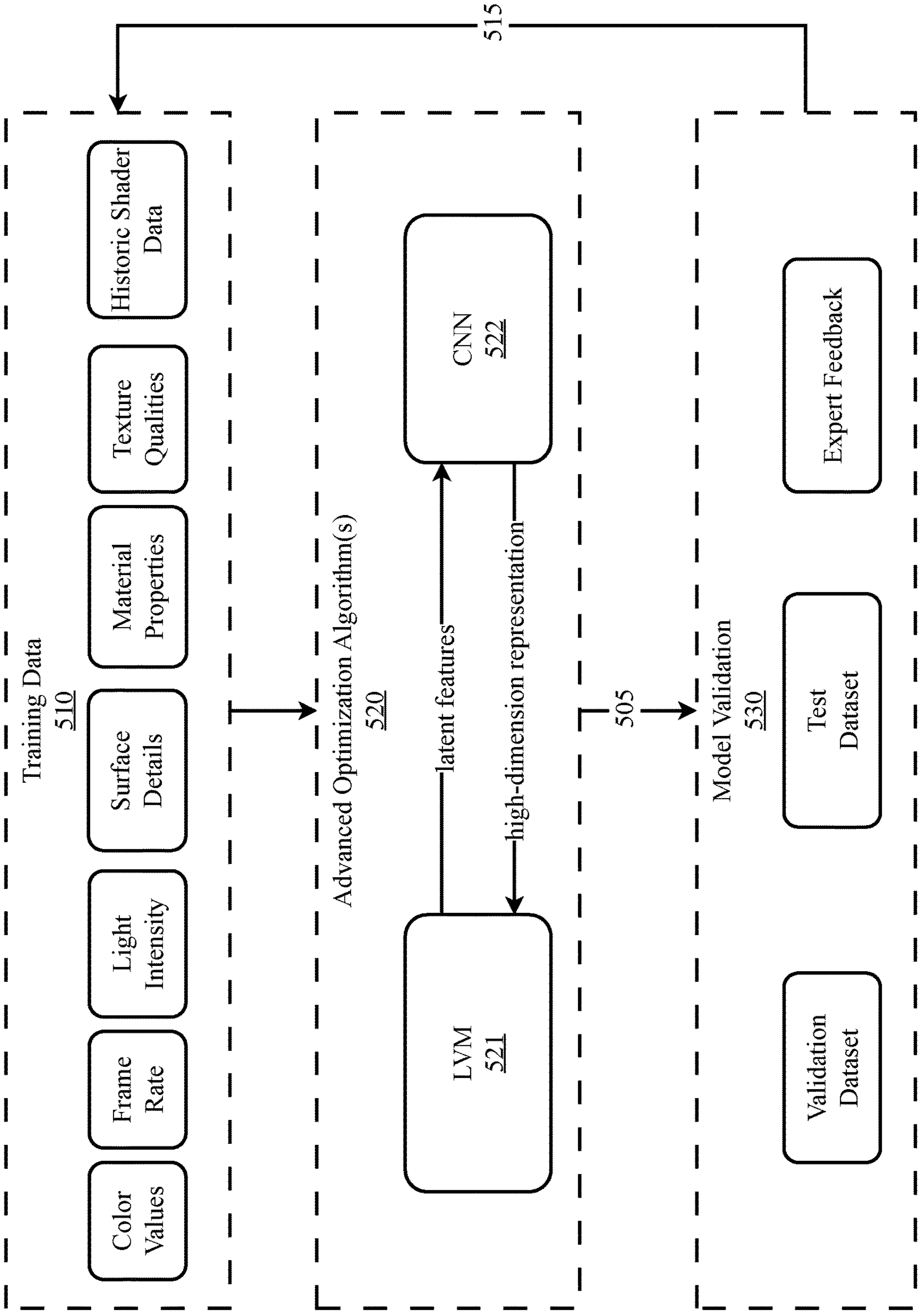
FIG. 5 is a diagram illustrating an exemplary training process for one or more optimization models, according to an embodiment.

FIG. 5 is a diagram illustrating an exemplary training process for one or more optimization models, according to an embodiment. The optimization models can include the artificial neural network(s). According to the embodiment, the training process may be carried out by training module 210. The process begins when system 100 receives, retrieves, or otherwise obtains a plurality of data 510 to be used for optimization model training. The training data 510 can include a plethora of shader designs, including information about design parameters, outcomes, and performance. By analyzing this information, the LVM and AI neural network learn to recognize patterns, correlations, and causations. Design parameters can include, but are not limited to, color values, frame rate, light intensity, surface details, material properties, texture qualities, and historic shader data (e.g., information about shaders that have performed well or met certain design criteria. Many 3D graphics engines and frameworks offer pre-built shader libraries and tools. These libraries often include common shaders and lighting, shadows, and materials that can be used as training data, according to an embodiment. The training data may be prepared (e.g., preprocessed, divided into training/validation/test datasets) and used to train the advanced optimization algorithms 520.

In various implementations, the advanced optimization algorithms 520 may comprise one or more latent variable models 521 and one or more neural networks such as a convolutional neural network (CNN) 522. In various embodiments, system 100 employs a combination of LVMs and neural networks to automate the creation of shaders. In such embodiments, the LVM can capture the underlying data distributions and the hidden patterns within the inputs 510. It uses these patterns to generate shaders. Additionally, a CNN can be utilized to understand and capture spatial hierarchies in the data. This is particularly useful for understanding the patterns in textures and color distributions in the shader creation process. Both the LVM and CNN work in tandem, with the LVM feeding the CNN inputs, and the CNN outputting more complex, hierarchical representations back to the LVM. The final shader generations may be a combination of the outputs of these two models.

The shader generation process begins with gathering input parameters, such as texture, color, lighting conditions, and artist's intent, among others. These parameters are then fed into the LVM, which extracts latent features from the data. The LVM then passes these latent features to the CNN, which, in turn, produces a high-dimensional representation of the shader, capturing more complex relationships in the data. This high-dimensional representation is then passed back to the LVM, which uses its generative capabilities to create the final shader. During this process, the LVM can also draw from its learned experiences, generating shaders that not only satisfy the current parameters but also align with previously successful designs. By examining past shader designs, the LVMs identify patterns and learn to replicate desired qualities in new shader designs.

AI, particularly latent variable models, are a critical component of system 100 and are used to extract and analyze latent variables from input data 510, helping the system understand the relationships between different shader variables and how these relationships contribute to the final shader output. LVMs are statistical models that are designed to capture underlying data distributions and hidden patterns within input data. In the context of shader creation, LVMs are used to understand the patterns and relationships present in the input data, which may include factors like lighting, color spectrum, and surface details, among others. The LVM 521 may use the identified patterns to generate initial shaders. The LVM 521 is first trained on the training data 510. During training, the LVM learns to capture underlying patterns, relationships, and latent representations within the input data. The output of the LVM typically consists of the learned latent variables, which represent abstract features or patterns within the data. Training module 210 can be configured to ensure that the data representations produced by the LVM 521 and the input data for the CNN 522 are compatible. This may involve scaling, normalizing, or reshaping the LVM's output to match the expected input shape of the CNN. The output of the LVM may be concatenated or merged with the original data 510 that will serve as input to the CNN. This can be done along one of the data dimensions, depending on the specific task and data structure. The result is a combined input that includes both the LVM's latent representations and the raw input data.

In an embodiment, the LVM 521 is a generative model, wherein it can generate new shaders that are like observed shaders. The system may learn to optimize shader generation based on learning what shaders perform the best. For example, the model may learn which shader configurations perform best in a specific lighting or composition and generate a shader with parameters like these configurations, at least as a starting point. Then, real-time shader generator 300 may be used to provide the shader to the system user, wherein the user may view, modify, apply, and/or test the shader, or submit a request for a new shader generation. The request for a new shader may also comprise a set of shader configuration parameters, which may be used as an input to the LVM 521 when generating a new shader. In this way, the system allows for and blends advanced optimization algorithms and customizable parameters to produce visually compelling and performance-efficient shaders.

In addition to LVM 521, system 100 incorporates CNNs 522. CNNs are a type of artificial neural network specifically designed for tasks involving spatial hierarchies and patterns, making them well-suited for tasks related to textures and color distributions. CNNs are used to analyze and capture spatial hierarchies and patterns within the input data 510, particularly those related to textures and color variation. Both the LVM and CNN work together in a cooperative manner. The LVM 521 initially processes the input data and identifies patterns, which it then feeds to the CNN 522. The CNN 522, in turn, further analyzes the data, capturing more complex and hierarchical representations of the input. The information obtained from both the LVM and CNN is combined to form the basis for generating shaders. The final output of the proposed system for shader generation is a result of the collaboration between the LVM and the CNN. The system leverages the patterns, relationships, and hierarchical representations extracted by these models to create shaders that meet the desired design criteria, such as visual appeal and performance efficiency.

According to the embodiment, the CNN architecture is designed to accept combined input, which now includes the latent variables from the LVM. The CNN can be designed with convolutional layers, pooling layers, fully connected layers, and output layers, depending on the embodiment. Training module 210 can train the CNN using the combined input data. During training, the CNN learns to make use of both the raw features and the abstract latent representations to perform the task effectively. The CNN's parameters may be updated through backpropagation 515, optimizing its ability to leverage the additional information provided by the LVM.

The advanced optimization algorithms 520 may be used to generate training outputs 505 which can be used to validate and test the advanced optimization algorithm's performance at the model validation stage 530. At this stage, the validation and/or test datasets may be used as inputs to the trained models 521, 522 to generate a shader using input data that the models have not encountered before. Additionally, or alternatively, the model training output may be analyzed and validated by experts in the field of the art. This expert feedback may be applied 515 to the next iteration of model training to improve model performance. Depending on the performance and task, it may be necessary to fine-tune the combined model (LVM+CNN) and perform hyper-parameter tuning 515 to achieve the desired results. This might include adjusting learning rates, batch sizes, and the architecture of the CNN.

This approach of combining the outputs of an LVM with a CNN can be particularly useful when dealing with complex shader data where the LVM captures high-level abstractions and the CNN focuses on local spatial patterns. It allows the CNN to benefit from the richer representations provided by the LVM, potentially improving the model's performance at generating shaders.

Figure 6:
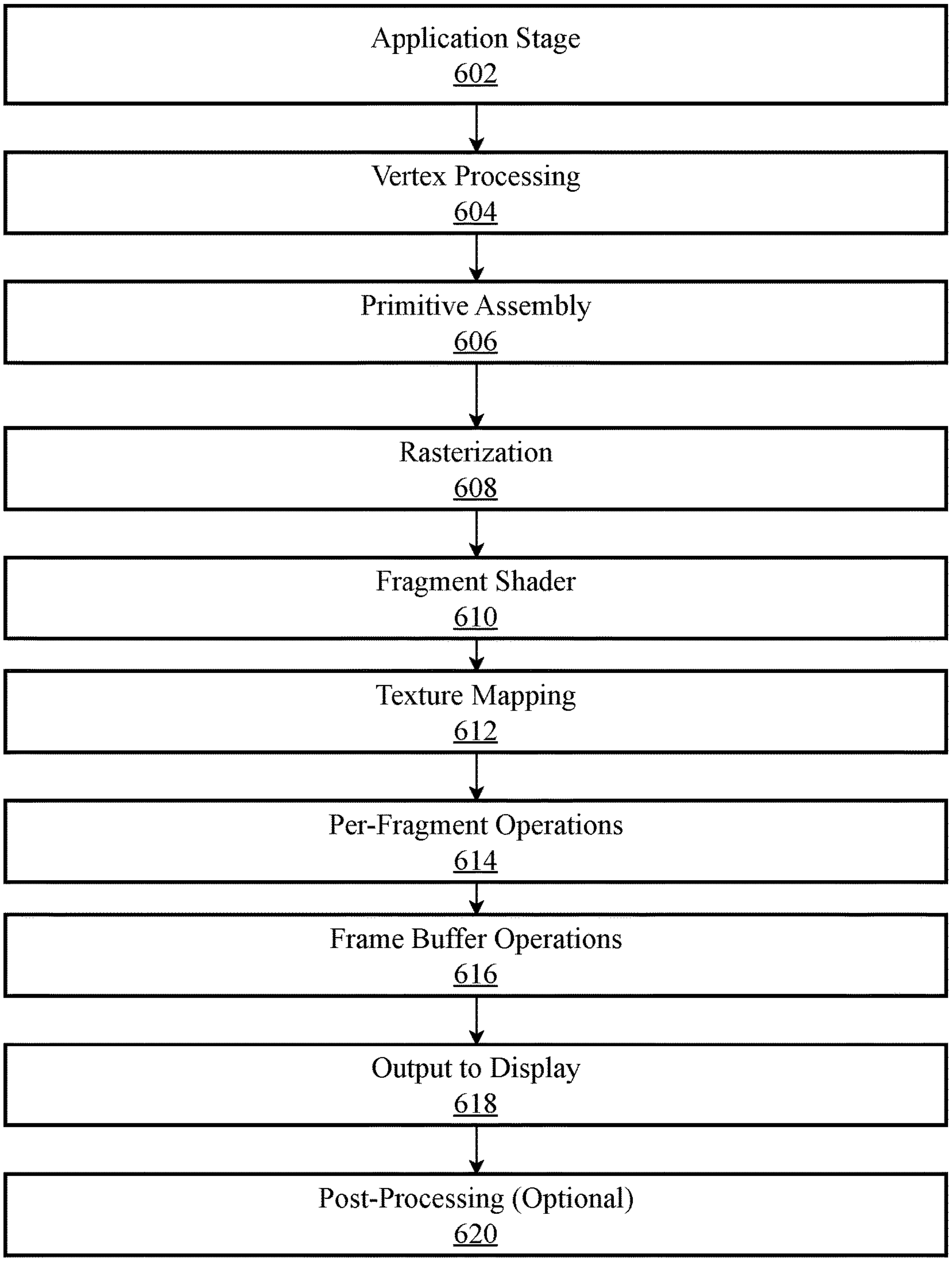
FIG. 6 is a diagram illustrating a general 3D graphics rendering pipeline which may be used to execute the functionality of an automated generative system for the creation of shaders.

FIG. 6 is a diagram illustrating a general 3D graphics rendering pipeline which may be used to execute the functionality of an automated generative system for the creation of shaders. The rendering pipeline, often referred to as the graphics pipeline or graphics rendering pipeline, is a series of stages 602-620 through which 3D graphics data is processed to produce the final 2D image that is displayed on a computer screen or other output device. This process is managed by the Graphics Processing Unit 120 and involves several stages, each of which is responsible for specific tasks. Provided is an exemplary illustration of a rendering pipeline in a typical 3D graphics system, like those used in real-time rendering for games and simulations.

The pipeline begins at the application stage 602. This is the initial stage where the 3D application, such as a game or simulation, prepares the 3D scene and submits commands to the GPU. The application provides data about the 3D models, camera positions, lights, and other scene properties. The first actual stage of the of the GPU pipeline is the vertex processing stage 604. Here, vertex data (e.g., position, normal, texture coordinates, etc.) for each vertex of 3D objects is transformed. This involves applying transformations such as translation, rotations, scaling, and perspective projection to position the vertices correctly in 3D space. It is in this stage that vertex shaders are executed to perform these translations.

After vertex processing, the GPU assembles the vertices into geometric primitives such as points, lines, or triangles during the primitive assembly stage 606. In some implementations, this stage may also comprise other vertex post processing steps including, but not limited to, clipping and/or face culling. The resulting primitives are then sent to the rasterization stage 608. Rasterization is the process of converting geometric primitives into fragments (i.e., pixels). It determines which pixels on the screen are covered by each primitive. This stage also computes attributes such as barycentric coordinates, which are used in later stages for interpolation.

The fragment shader 610 stage is responsible for determining the color and other attributes of each fragment (pixel) on the screen. The data for each fragment from the rasterization stage is processed by the fragment shader. It calculates lighting, texture mapping, and material properties for the fragments. The fragment shader is used to implement advanced rendering techniques such as Phong shading, texture mapping, and normal mapping. The texture mapping 612 stage involves mapping textures onto the fragments to provide detailed and realistic surface appearances. The fragment shader fetches texels (texture pixels) from textures and applies them to the fragments. After the fragment shader, several per-fragment operations 614 may be performed, such as alpha bending, depth testing, and stencil testing. For example, depth testing determines which fragments are visible and which are obscured by others.

The final fragments are combined and written to the frame buffer (e.g., the screen's image buffer). Operations 616 like alpha bending (combining the color of overlapping fragments), depth buffering (for correct depth ordering), and stencil operations may be applied at this stage. The frame buffer's contents are ultimately displayed on the screen or sent to an output device 618. This produces the final 2D image that users/viewers see. There are some optional post-processing effects 620 that may be applied after the 3D scene is rendered. Effects like bloom, motion blur, and tone mapping may be applied to enhance the final image. Post-processing shaders are applied to the entire rendered frame in this stage.

The rendering pipeline is highly parallel, allowing the GPU to process many vertices and fragments simultaneously. It's designed for efficiency and speed, making it possible to render complex 3D scenes in real-time.

According to various embodiments, the LVM may be based on any suitable algorithm known to those with skill in the art including, but not limited to, principal component analysis, generative models, factor analysis, gaussian mixture models, and/or the like.

Detailed Description of Exemplary Aspects

Figure 7:
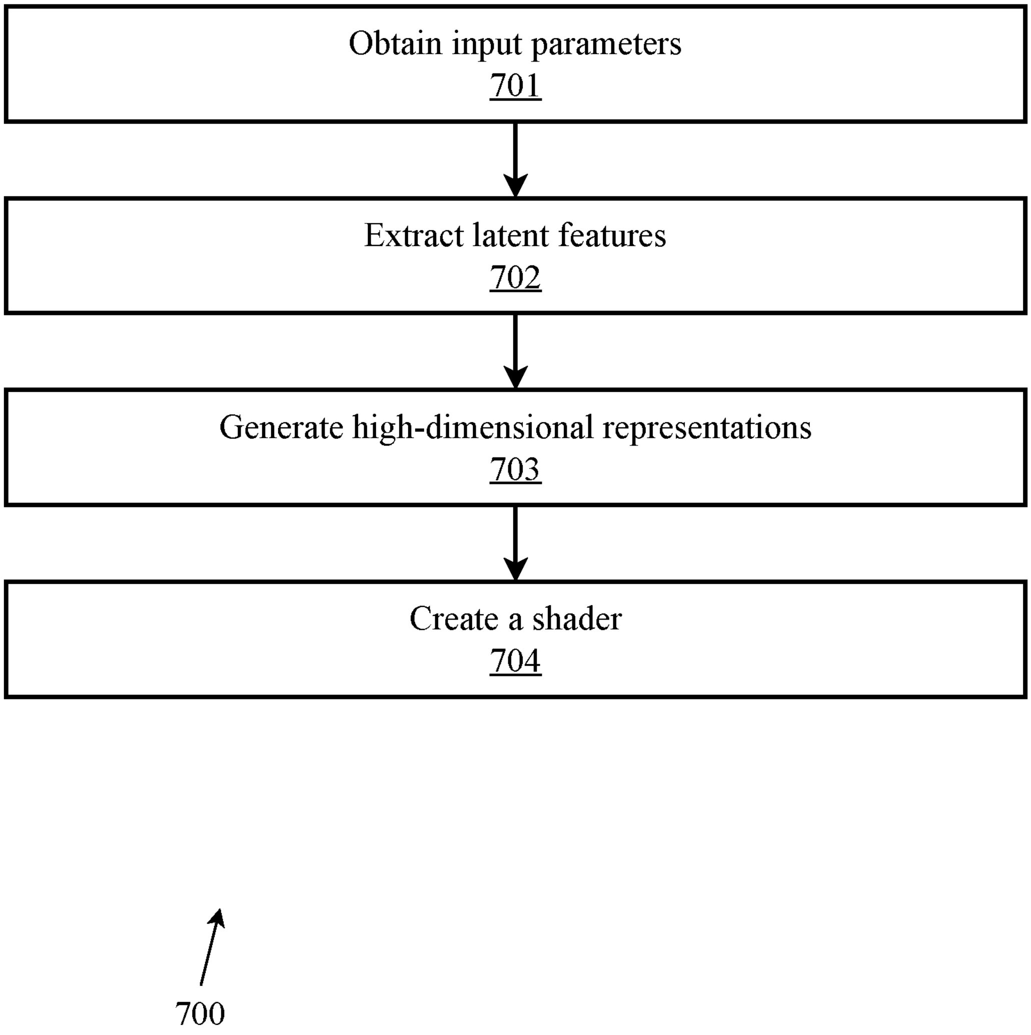
FIG. 7 is a flow diagram illustrating an exemplary method for generating a shader, according to an aspect.

FIG. 7 is a flow diagram illustrating an exemplary method 700 for generating a shader, according to an aspect. According to the aspect, the process begins at step 701 when system 100 receives, retrieves, or otherwise obtains input parameters associated with a shader specification. In some embodiments, the input parameters may be obtained from a user interacting with user interface 110 and/or real-time shader generator 300. In some embodiments, the input parameters may be obtained from a database comprising a plurality of input parameters and their associated shader effects. In yet other embodiments, the input parameters may be derived, computed, or otherwise inferred by a component of system 100 or some external service or system which can provide such data. The obtained input parameters may be used as an input to a trained LVM configured to extract latent features hidden in the input data at step 702. The extracted features may then be used as an input into a CNN at step 703 wherein the CNN is configured to generate high-dimensional representations of the input parameters and the resulting shaders configurations. As a last step 704, the high-dimensional representations may be used as in input back into the LVM which processes the high-dimensional representations to create a shader that satisfies the criteria set forth by the input parameters.

Exemplary Computing Environment

Figure 8:
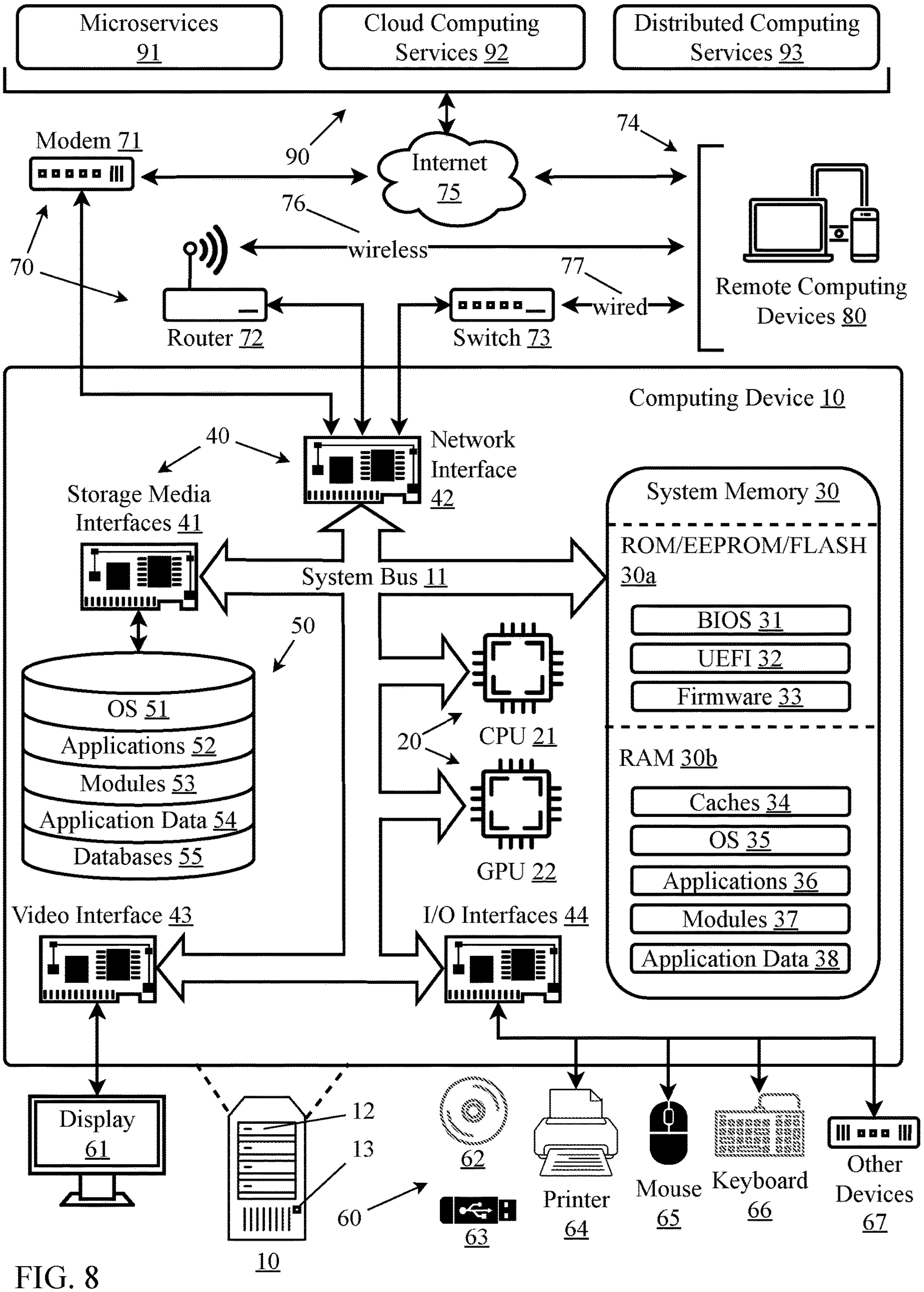
FIG. 8 illustrates an exemplary computing environment on which an embodiment described herein may be implemented, in full or in part.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 (“Firewire”) interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as “flash drives” or “thumb drives”) 63, printers 64, pointers and manipulators such as mice 65, keyboards 66, and other devices such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). However, the term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable or independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory **30*a* such as read only memory (ROM), electronically-erasable programmable memory (EEPROM), or rewritable solid-state memory (commonly known as "flash memory"). Non-volatile memory 30***a* is not erased when power to the memory is removed. Non-volatile memory 30*a* is typically used for long-term storage a basic input/output system (BIOS) 31, containing the basic instructions, typically loaded during computer startup, for transfer of information between components within computing device, unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* such as random-access memory (RAM) is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage provide long-term storage of data. Data on non-volatile data storage devices 50 is not erased when power to the non-volatile data storage devices 50 is removed. Non-volatile data storage devices 50 may be implemented using technology for non-volatile storage of content such as CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing 10 as in the case of internal hard drives, removable from computing device 10 as in the case of external USB hard drives, or a combination thereof, but computing device will comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 30 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services.

Microservices 91 are collections of small, loosely coupled, and independently deployable computing services. Each microservice represents a specific business functionality and runs as a separate process or container. Microservices promote the decomposition of complex applications into smaller, manageable services that can be developed, deployed, and scaled independently. These services communicate with each other through well-defined APIs (Application Programming Interfaces), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. For example, cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for automated three-dimensional (3D) graphics shader design, creation, and optimization, comprising:

- a computing system comprising a processor, a memory, a display, and a network interface;
- a shader optimization engine comprising a first plurality of programming instructions that, when operating on the processor, cause the computing system to:
  - receive a plurality of design parameters describing one or more characteristics of a three-dimensional digital model of an object;
  - process the plurality of design parameters through a statistical, probabilistic latent variable model (LVM), by performing probabilistic inference conditioned on the plurality of observed design parameters using learned probability distributions, to generate one or more latent variables associated with the plurality of design parameters;
  - process the one or more latent variables through a convolutional neural network (CNN) to generate a high-dimensional representation of an initial shader for the three-dimensional digital model of the object;
  - process the high-dimensional representation of the shader through the statistical, probabilistic LVM as a second, post-synthesis probabilistic inference operation that evaluates the high-dimensional representation against learned distributions of valid shader configurations and infers a final shader that satisfies probabilistic design and performance constraints for the three-dimensional digital model of the object; and
  - display the object on the display using the final shader.

2. The system of claim 1, further comprising a real-time shader generator comprising a second plurality of programming instructions that, when operating on the processor, cause the computing system to:

- generate and render on the display a user interface that enables a user to view and modify a plurality of 3D graphics shaders generated by the shader optimization system in real-time;
- instruct the shader optimization engine generate a plurality of final shaders of the object;
- display the object on the display using each of the plurality of final shaders;
- capture a user configuration parameter from the user interface modifying one or more of the final shaders; and
- adapt the plurality of 3D shaders in real-time based on the configuration parameter.

3. The system of claim 2, wherein the user configuration parameter is used as feedback to further refine the LVM and CNN by feeding the user configuration parameter back into the shader optimization engine as one of the plurality of design parameters.

4. The system of claim 3, wherein the shader optimization engine is configured to utilize a plurality of LVMs and CNNs to adapt the plurality of 3D shaders.

5. The system of claim 1, wherein the LVM and CNN are trained using a plurality of training data prior to their use by the shader optimization engine.

6. The system of claim 5, wherein the training data comprises information about shader design parameters, outcomes, and performance.

7. The system of claim 6, wherein the training data further comprises expert feedback.

8. The system of claim 1, wherein the plurality of design parameters comprises two or more of color value, frame rate, light intensity, surface detail, material properties, and texture qualities.

9. A method for automated three-dimensional (3D) graphics shader design, creation, and optimization, comprising the steps of:

- receiving a plurality of design parameters describing one or more characteristics of a three-dimensional digital model of an object;
- processing the plurality of design parameters through a statistical, probabilistic latent variable model (LVM), by performing probabilistic inference conditioned on the plurality of observed design parameters using learned probability distributions, to generate one or more latent variables associated with the plurality of design parameters;
- processing the one or more latent variables through a convolutional neural network (CNN) to generate a high-dimensional representation of an initial shader for the three-dimensional digital model of the object;
- processing the high-dimensional representation of the shader through the statistical, probabilistic LVM as a second, post-synthesis probabilistic inference operation that evaluates the high-dimensional representation against learned distributions of valid shader configurations and infers a final shader that satisfies probabilistic design and performance constraints for the three-dimensional digital model of the object; and
- displaying the object on the display using the final shader.

10. The method of claim 9, further comprising the steps of:

- generating and rendering on the display a user interface that enables a user to view and modify a plurality of 3D graphics shaders generated by the shader optimization system in real-time;
- instructing the shader optimization engine to generate a plurality of final shaders of the object;
- displaying the object on the display using each of the plurality of final shaders;
- capturing a user configuration parameter from the user interface modifying one or more of the final shaders; and
- adapting the plurality of 3D shaders in real-time based on the configuration parameter.

11. The method of claim 10, wherein the user configuration parameter is used as feedback to further refine the LVM and CNN by feeding the user configuration parameter back into the shader optimization engine as one of the plurality of design parameters.

12. The method of claim 11, wherein the shader optimization engine is configured to utilize a plurality of LVMs and CNNs to adapt the plurality of 3D shaders.

13. The method of claim 9, further comprising the step of training the LVM and CNN using a plurality of training data prior to their use by the shader optimization engine.

14. The method of claim 13, wherein the training data comprises information about shader design parameters, outcomes, and performance.

15. The method of claim 14, wherein the training data further comprises expert feedback.

16. The method of claim 9, wherein the plurality of design parameters comprises two or more of color value, frame rate, light intensity, surface detail, material properties, and texture qualities.

* * * * *